(12) United States Patent
Blanquart et al.

(10) Patent No.: US 11,208,904 B2
(45) Date of Patent: Dec. 28, 2021

(54) METHOD FOR MANUFACTURING A VANE FROM A COMPOSITE MATERIAL WITH A FITTED METAL LEADING EDGE FOR A GAS TURBINE

(71) Applicant: SAFRAN, Paris (FR)

(72) Inventors: Magalie Blanquart, Moissy-Cramayel (FR); Maximilien Farrands, Moissy-Cramayel (FR); Romain Picon, Moissy-Cramayel (FR)

(73) Assignee: SAFRAN, Paris (FR)

( * ) Notice: Subject to any disclaimer, the term of this patent is extended or adjusted under 35 U.S.C. 154(b) by 0 days.

(21) Appl. No.: 17/041,878

(22) PCT Filed: Mar. 20, 2019

(86) PCT No.: PCT/FR2019/050640
§ 371 (c)(1),
(2) Date: Sep. 25, 2020

(87) PCT Pub. No.: WO2019/186029
PCT Pub. Date: Oct. 3, 2019

(65) Prior Publication Data
US 2021/0010377 A1    Jan. 14, 2021

(30) Foreign Application Priority Data
Mar. 28, 2018    (FR) ..................................... 1852675

(51) Int. Cl.
*F01D 5/28*    (2006.01)
*B29C 70/86*    (2006.01)
(Continued)

(52) U.S. Cl.
CPC .............. *F01D 5/282* (2013.01); *B29C 70/86* (2013.01); *B29C 2793/009* (2013.01);
(Continued)

(58) Field of Classification Search
CPC ............................. F01D 5/282; B29L 2031/08
(Continued)

(56) References Cited

U.S. PATENT DOCUMENTS 4,010,530 A * 3/1977 Delgrosso ............. F04D 29/324
                                                    29/889.71
8,734,925 B2 * 5/2014 Kweder ............. B29D 99/0028
                                                    428/35.7
(Continued)

FOREIGN PATENT DOCUMENTS

FR          1 230 668 A    9/1960
WO    WO 2013/088040    12/2012

OTHER PUBLICATIONS

International Search Report as issued in International Patent Application No. PCT/FR2019/050640, dated Jul. 9, 2019.

*Primary Examiner* — Michael L Sehn
(74) *Attorney, Agent, or Firm* — Pillsbury Winthrop Shaw Pittman LLP

(57) ABSTRACT

A method for manufacturing a vane from a composite material with a fitted metal leading edge includes the successive draping, on a template of the leading edge of the vane to be manufactured, of a first layer of a base material and of a second layer of an adhesive material, the transfer of the first and second draped layers in the recess of a metal foil, the positioning of the foil including the first and second draped layers alongside the leading edge of a vane preform including a fiber reinforcement impregnated with a precursor of a matrix, the co-curing of the vane preform and of the first and second draped layers so as to obtain a vane made of composite material including on its leading edge a bonded metal foil.

8 Claims, 6 Drawing Sheets

(51) Int. Cl.
   *B29K 705/00* (2006.01)
   *B29L 31/08* (2006.01)
(52) U.S. Cl.
   CPC .. *B29C 2793/0081* (2013.01); *B29K 2705/00* (2013.01); *B29L 2031/08* (2013.01); *F05D 2230/50* (2013.01); *F05D 2300/603* (2013.01)
(58) Field of Classification Search
   USPC ........................................................ 416/224
   See application file for complete search history.

(56) References Cited

U.S. PATENT DOCUMENTS

2007/0092379 A1    4/2007   Coupe et al.
2013/0101406 A1    4/2013   Kweder et al.
2016/0167269 A1    6/2016   Pautard

* cited by examiner

METHOD FOR MANUFACTURING A VANE FROM A COMPOSITE MATERIAL WITH A FITTED METAL LEADING EDGE FOR A GAS TURBINE

CROSS-REFERENCE TO RELATED APPLICATIONS

This application is the U.S. National Stage of PCT/FR2019/050640, filed Mar. 20, 2019, which in turn claims priority to French patent application number 1852675 filed Mar. 28, 2018. The content of these applications are incorporated herein by reference in their entireties.

BACKGROUND OF THE INVENTION

The present invention relates to the general field of the manufacture of vanes for aeronautical gas turbine engine from a composite material comprising a metal leading edge.

The presence of a metal foil on the leading edge of an aeronautical gas turbine engine vane made of composite material allows protecting the composite vane assembly from abrasion/erosion and during the impact of a foreign body. This is in particular the case for the fan blades of an aeronautical turbomachine which are exposed to the ingestion of a bird, hail, ice, etc. but also for vanes of a gas turbine straightener or diffuser.

There are many methods for producing a gas turbine engine vane from a composite material. For example, the manual laminate/draping process, the process for injection molding a fibrous preform, the embroidery process, the thermo-compression process, etc. can be mentioned. These processes are mainly based on the use of a thermosetting (TS) or thermoplastic (TP) resin.

Once the composite material vane is obtained, it is then necessary to assemble the protective metal foil on its leading edge. For this purpose, the metal foil, which is produced by mechanical processes such as stamping, forming or electroforming, for example, is bonded to the leading edge of the composite material vane. This operation can be carried out in a mold ensuring the bonding of the metal foil. Examples of composite material vanes provided with a metal foil on their leading edge are described in particular in documents US2007092379 and US20160167269.

However, the bonding of the metal foil to the leading edge of the composite material vane is a delicate operation, particularly regarding the control of the reproducibility of the installation and distribution of the adhesive material between the vane and the foil. If the adhesive material layer is not uniformly present between the vane and the foil, the quality of the bond is degraded, which leads to a decrease in the mechanical strength of the foil and, consequently, a risk of loss of the foil in case of impact with an object or under stress of delamination forces.

OBJECT AND SUMMARY OF THE INVENTION

The main aim of the present invention is therefore to propose a method for manufacturing a vane from a composite material provided with a metal leading edge which does not have the aforementioned drawbacks.

In accordance with the invention, this aim is achieved by means of a method for manufacturing a vane from a composite material with a fitted metal leading edge for an aeronautical gas turbine engine, the method comprising:

the successive draping, on a template of the leading edge of the vane to be manufactured, of a first layer of a base material and of a second layer of an adhesive material, the transfer of the first and second draped layers in the recess of a metal foil, the positioning of the foil comprising the first and second draped layers alongside the leading edge of a vane preform comprising a fiber reinforcement impregnated with a precursor of a matrix, the co-curing of the vane preform and of the first and second draped layers so as to obtain a vane made of composite material including on its leading edge a bonded metal foil.

By conforming the first base material layer and the second adhesive material layer on a template corresponding to the shape of the leading edge of the vane to be manufactured and by transferring these layers from the template to the foil, a continuous fixing interface is ensured between the foil and the leading edge of the preform. This prevents thus the appearance of porosities at the bottom of the recess or spout formed by the foil, which improves the strength of the foil on the vane while ensuring very good reproducibility of the positioning of the fitted assembly on the vane constituted by the foil, the base material layer and the adhesive material layer.

According to a first particular characteristic of the method of the invention, the step of transferring the first and second draped layers in the recess of the metal foil comprises the installation of the metal foil on the adhesive material layer and the removal of the assembly formed by the foil and the first and second layers from the template of the leading edge.

According to a second particular characteristic of the method of the invention, this method further comprises, after installation of the metal foil on the adhesive material layer and before the removal of the assembly formed by the foil and the first and second draped layers, the cutting out of the portions of said first and second draped layers extending beyond the foil.

According to a third particular characteristic of the method of the invention, this method further comprises, before the draping of the first and second layers on the template of the leading edge, the deposition of an anti-adhesive layer on the template. This allows facilitating the removal of the assembly constituted by the foil, the base material layer and the adhesive material layer According to a fourth particular characteristic of the method of the invention, this method further comprises, before the draping of the first and second layers on the template of the leading edge, the adjustment of the foil on the template.

According to a fifth particular characteristic of the method of the invention, the base material of the first layer is chosen from: glass fibers, fine bronze yarns, carbon fibers.

According to a sixth particular characteristic of the method of the invention, the adhesive material of the second layer is chosen from: epoxy adhesive, reinforced epoxy adhesive, epoxy adhesive film, reinforced epoxy adhesive film.

The method of the present invention applies in particular to the manufacture of a fan vane, an outlet guide vane, an inlet guide vane or a variable stator vane.

BRIEF DESCRIPTION OF THE DRAWINGS

Other characteristics and advantages of the present invention will emerge from the description given below, with reference to the appended drawings which illustrate exemplary embodiments thereof without any limiting nature. In the figures.

DETAILED DESCRIPTION OF THE INVENTION

The invention applies to the production of vanes made of composite material for an aeronautical gas turbine engine having a metal leading edge.

Non-limiting examples of such vanes are in particular fan vanes, outlet guide vanes (called OGV), inlet guide vanes (called IGV), variable stator vanes (called VSV), etc.

Figure 1:
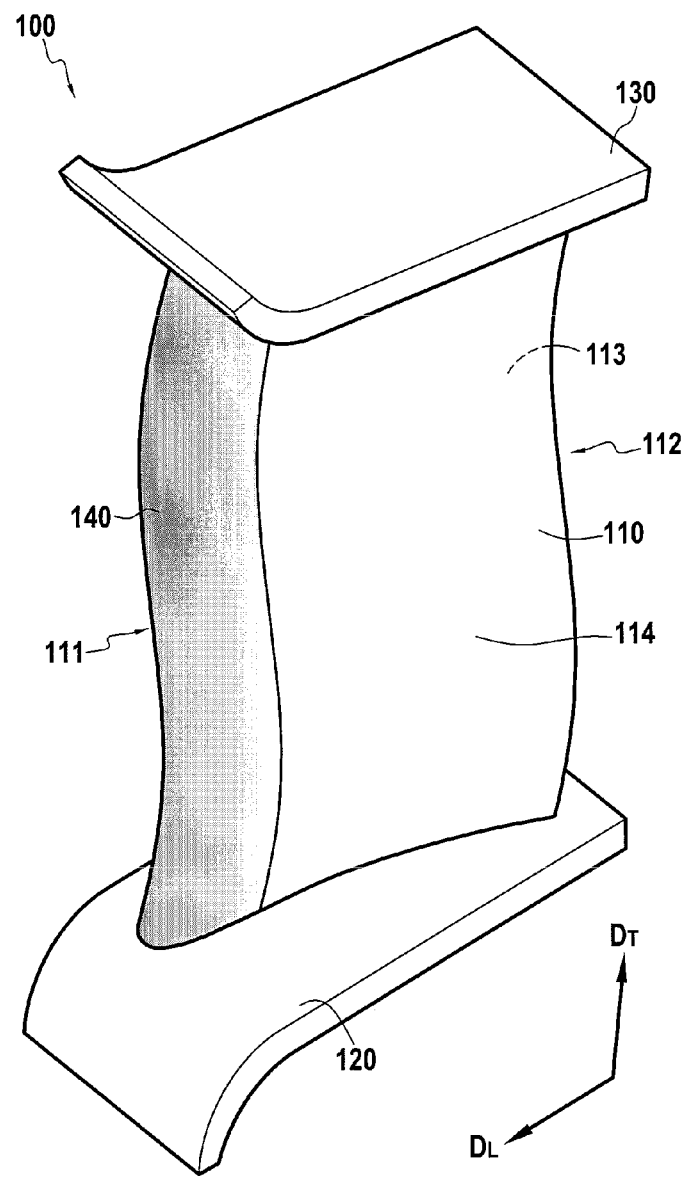
FIG. 1 is a schematic perspective view of an outlet guide vane according to one embodiment of the invention.

A method according to the invention will be described in relation to the manufacture of an outlet guide vane such as the vane 100 illustrated in FIG. 1 which comprises a vane body 110 extending along a longitudinal direction DL between an internal platform 120 and an external platform 130 and along a transverse direction DT between a leading edge 111 and a trailing edge 112. The vane body 110 also includes an intrados face 113 and an extrados face 114. A foil made of metal material 140 is further bonded to the vane body 120 at the leading edge 111.

Figure 2:
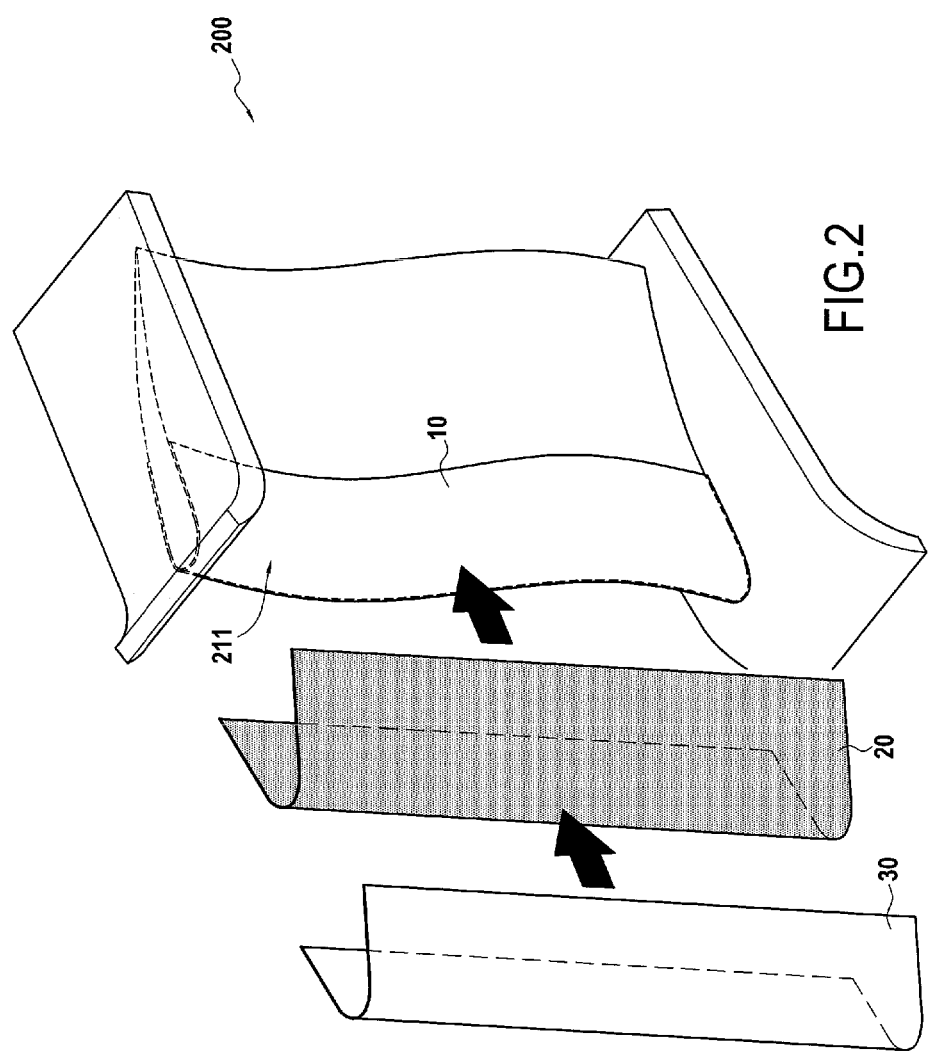
FIG. 2 is a schematic perspective view showing the draping of a base layer and of an adhesive layer on a template.

The method for manufacturing the vane 100 begins with the successive draping on a template of the leading edge of the vane to be manufactured, of a first layer of a base material and of a second layer of an adhesive material as illustrated in FIG. 2. More specifically, as represented in FIG. 2, a template 200 is used comprising at least one portion 211 reproducing the shape and the dimensions of the leading edge 111 of the vane 100 to be manufactured. The template 200 can be a part made especially for the implementation of the method of the invention or correspond to a rejected part or even correspond to a test part.

Before the draping, the portion 211 of the template 200 is preferably covered with a layer 10 constituted of an anti-adhesive material, for example polytetrafluoroethylene (PTFE). A first base material layer 20 is first of all draped on the portion 211 covered or not with the layer 10. The first layer 20 can be a stratum or a bidirectional (2D-woven) ply made of a material chosen from one of the following materials: glass fibers, fine bronze yarns as used in the Bronze Mesh product manufactured by the company Lumicor®, carbon fibers. A second adhesive material layer 30 is then draped on the layer 20. The second layer 20 can be constituted of an epoxy-based adhesive, reinforced or not, or of an epoxy-based adhesive material film, reinforced or not. The adhesive material can for example correspond to the epoxy resin EA914 manufactured by the company Hysol®, to the adhesive film AF191 manufactured by the company 3M®, to the adhesive film FM300 manufactured by the company Cytec®, or to the epoxy resin EA9396 manufactured by the company Hysol®.

By draping the layers 20 and 30 on the template 200, they are conformed following a geometry corresponding exactly to that of the leading edge of the vane to be made.

Figure 3:
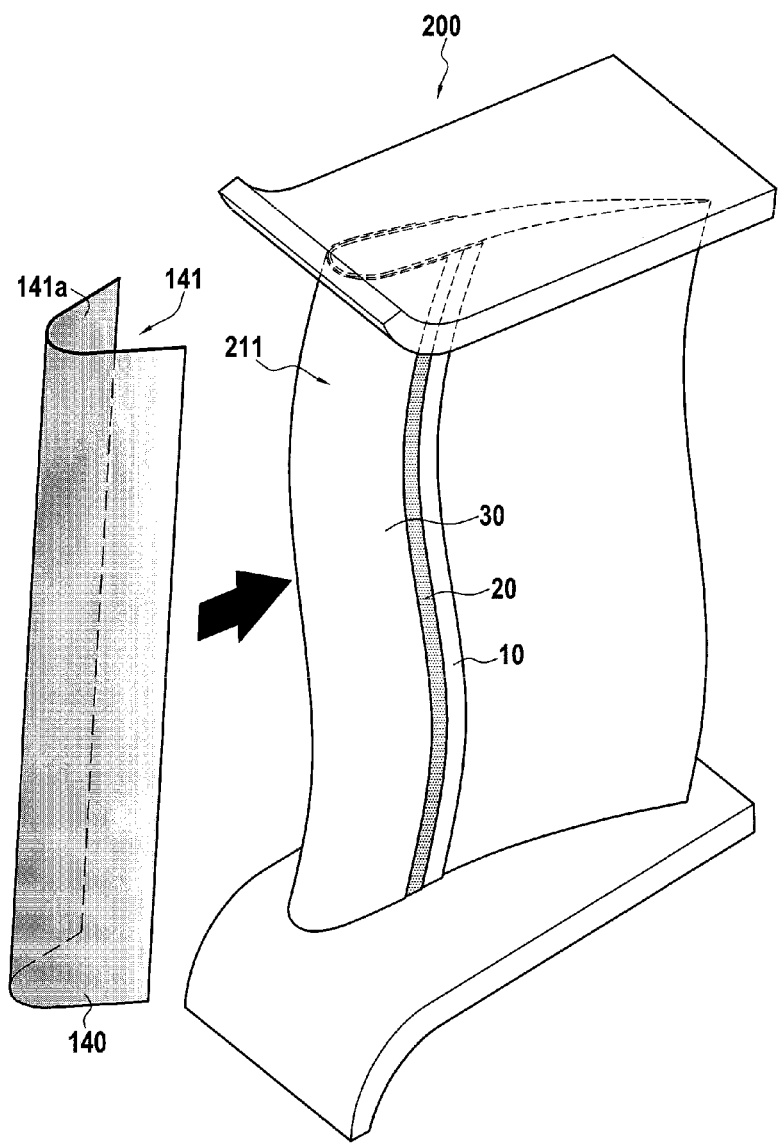
FIG. 3 is a schematic perspective view showing the positioning of a metal foil alongside the template of FIG. 2.

Once the first and second layers 20 and 30 are draped on the portion 211 of the template 200, a foil made of metal material 140 is placed on the second adhesive material layer 30 as illustrated in FIG. 3. The foil 140 can be made for example of stainless steel. The foil 140 has a shape and dimensions corresponding to the trailing edge of the vane to be manufactured. The foil 140 has a spout shape which defines a recess 141 on the wall 141a of which the first and second draped layers 20 and 30 will be fixed.

Before the draping of the first and second layers 20 and 30 on the template 200, the foil 140 can be adjusted on the template 200. The adjustment of the foil 140 on the template 200 can correspond to an adjustment of the dimensions of the foil, for example its length, and/or of the shape of the foil, for example its curvature or its twisting. The thickness of the metal foil being very small and its conformation on the template is produced by manual pressures.

Figure 4:
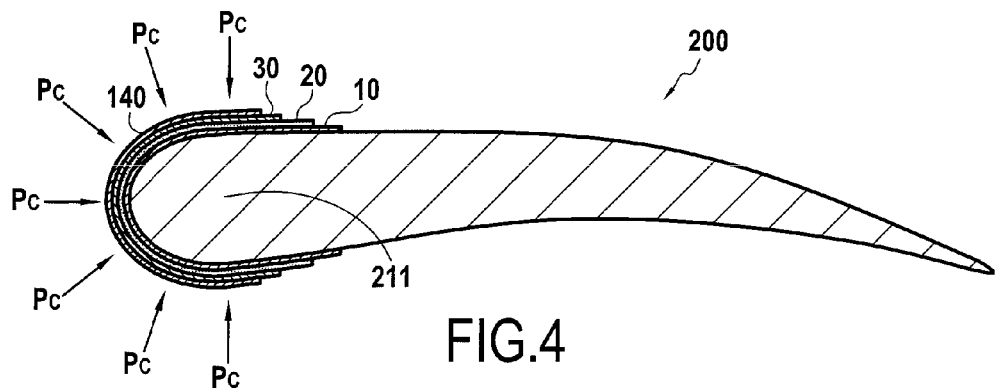
FIG. 4 is a schematic perspective view showing the compaction of the base layer and of the adhesive layer with the metal foil.

The first and second layers 20 and 30 can be compacted by applying a compaction pressure $P_C$ to the foil 140 as represented in FIG. 4. For this purpose, the template 200 provided with the first and second layers 20 and 30 and with the foil 140 are disposed in a tooling (not represented in FIG. 4) able to exert the compaction pressure $P_C$ on the foil 140.

Figure 5:
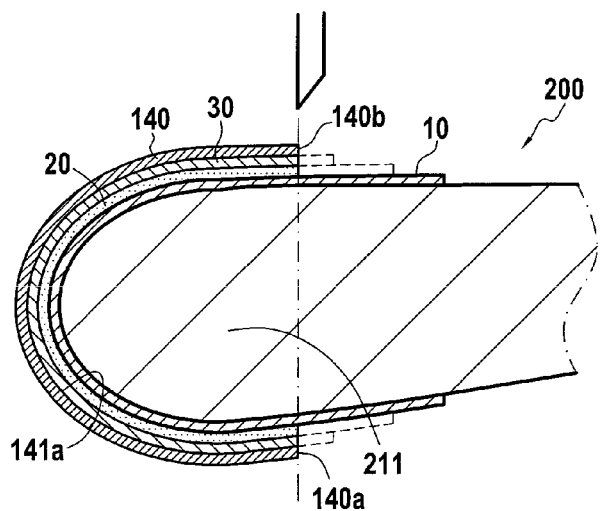
FIG. 5 is a schematic perspective view showing the cutting out of the portions of the base layer and of the adhesive layer which protrude from the metal foil.

As represented in FIG. 5, the portions of the first and second layers 20 and 30 which extend outside of the foil 140 are then cut out, the edges 140a and 140b of the foil being used to mark the cut line on the template 200. This operation is optional and, according to a variant of implementation, the first and second layers 20 and 30 of the foil 140 are allowed to protrude.

Figure 6:
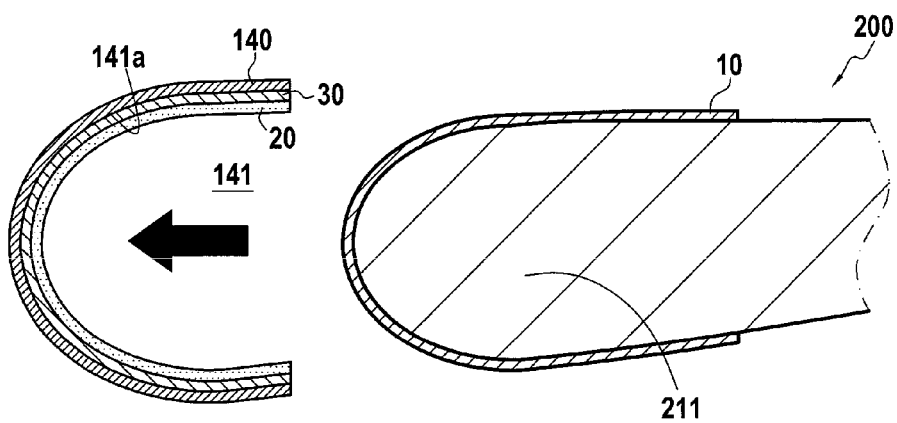
FIG. 6 is a schematic perspective view showing the removal of the metal foil provided with the base layer and with the adhesive layer from the template.
Figure 7:
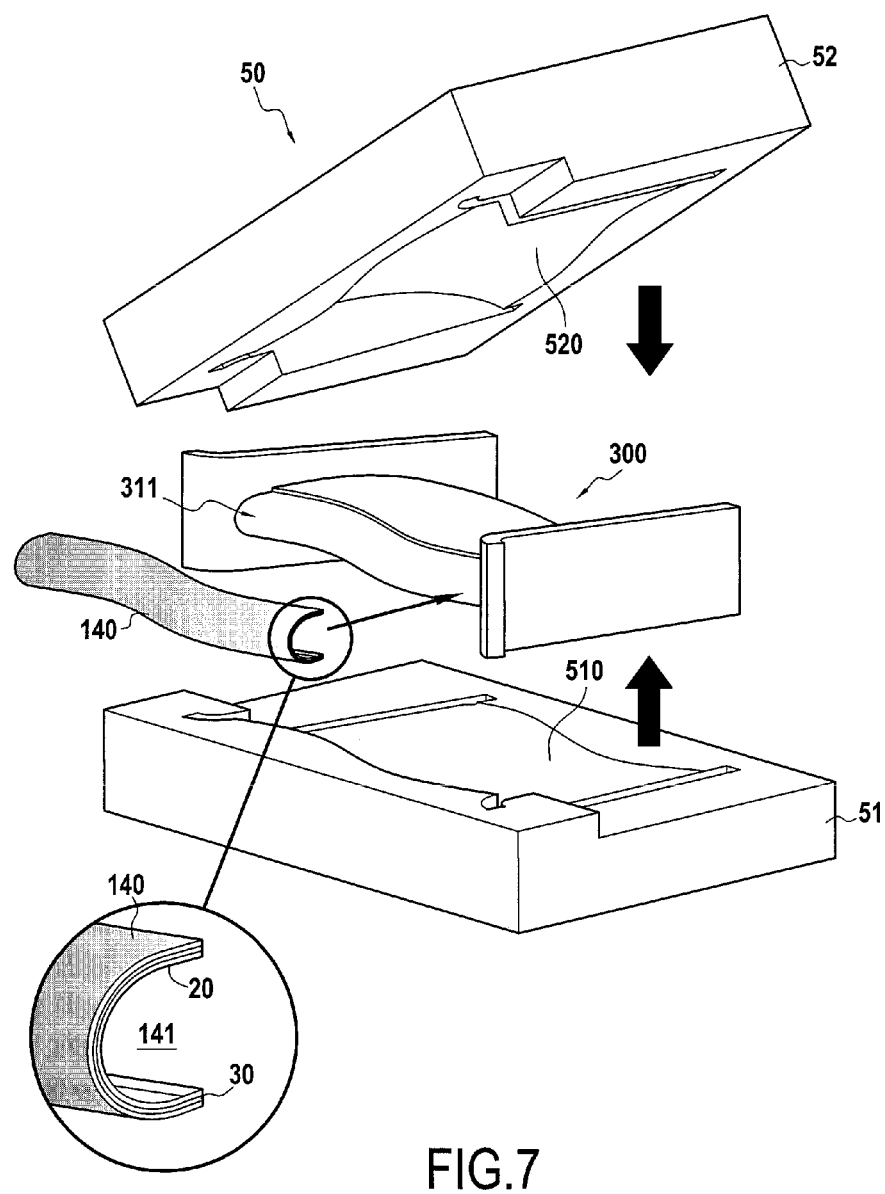
FIG. 7 is a schematic perspective view showing the positioning of the metal foil provided with the base layer and with the adhesive layer alongside an outlet guide vane preform and then the molding of the assembly.

The assembly formed by the foil 140 and the first and second layers 20 and 30 fixed to the surface 141a of the recess 141 of the foil is removed from the template 200 (FIG. 6). This assembly is then positioned alongside the leading edge 311 of an outlet guide vane preform 300 (FIG. 7). The layers 20 and 30 having been conformed to the exact shape of the trailing edge of the vane to be manufactured and transferred from the template in the recess 141 of the foil 140, a continuous fixing interface is ensured between the foil 140 and the leading edge 311 of the preform 300.

The composite material vane is obtained from a fiber reinforcement densified by a matrix. In this case, it is manufactured from a fibrous preform that can be obtained in different ways known to those skilled in the art. Typically, the preform can be obtained directly by three-dimensional (3D) weaving of yarns (formed for example of carbon fibers) or by draping of two-dimensional fibrous fabrics. The manufacture of an outlet guide vane from a composite material obtained from a fiber reinforcement produced by three-dimensional weaving and densified by a matrix is in particular described in document WO2013088040. In the example described here, the outlet guide vane preform 300 is obtained from a plurality of two-dimensional (2D fabric) strata or plies made of pre-impregnated and draped carbon fibers. The outlet guide vane preform can also be obtained from a fiber reinforcement made of carbon fibers produced by three-dimensional weaving, the reinforcement having been impregnated with a thermosetting resin, for example an epoxy-type resin.

Alternatively, these composite material vanes can be obtained directly by injection into a mold of a thermoplastic resin (TP) reinforced by short, long loads, etc. In this case, the resin is not completely transformed (polymerized) in order to allow its co-curing with the assembly formed by the foil and the first and second layers fixed to the surface of the foil recess.

Figure 8:
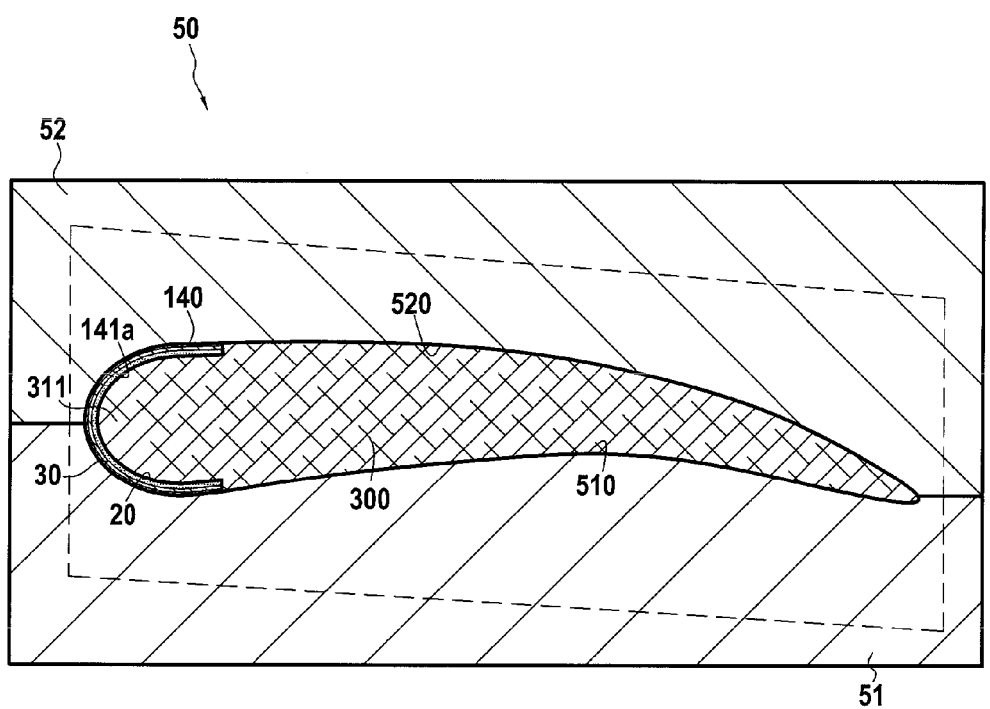
FIG. 8 is a schematic view showing the co-curing of the vane preform of FIG. 7 with the metal foil provided with the base layer and with the adhesive layer in a mold.

The vane manufacturing method continues by placing in a curing mold 50 the preform 300 and the assembly formed by the foil 140 and the first and second layers 20 and 30, positioned on the leading edge 311 of the preform 300. In a known manner, the curing mold 50 comprises two shells 51 and 52 each including respectively a cavity 510 and 520, the cavities 510 and 520 forming, once joined (i.e. after the closing of the mold), a mold recess 530 corresponding to the shape of the vane to be manufactured (FIG. 8).

The mold 50 is then heated to a temperature making it possible to obtain the co-curing of the preform 300 with the assembly formed by the foil 140 and the first and second layers 20 and 30. The different layers, namely the pre-impregnated preform and the second layer (adhesive layer), have compatible curing cycles allowing the polymerization of the elements at the same time. The mold can be heated via the plates of the press, in an autoclave, or be provided with heating means, the heating being carried out according to a temperature ramp defined up to a temperature allowing the polymerization of the various polymers, a pressure being applied during this temperature rise in order to control the creep. A polymerization level is then applied followed by a drop in temperature following a new defined ramp. The polymerization of the layers 20 and 30 takes place at the same time as the polymerization of the resin of the preform 300. The resins being compatible, the layers 20, 30 and the preform 300 become secured to each other during the curing.

After co-curing, the vane is removed from the mold. It can possibly undergo a post-curing cycle to improve its thermo-mechanical characteristics (increase in the glass transition temperature). No machining is necessary since, the part being molded, it meets the required dimensions. The vane 100 illustrated in FIG. 1 is then obtained, which comprises a vane body 110 provided with internal 120 and external 130 platforms made of composite material with the metal foil 140 bonded to the leading edge 111 of the vane 100.

The method of the invention also applies in particular to the manufacture of blades with or without platforms such as fan vanes and variable stator vanes used on unducted engines ("open rotor").

The invention claimed is:

1. A method for manufacturing a vane from a composite material with a fitted metal leading edge for an aeronautical gas turbine engine, the method comprising:
   successively draping, on a template of a leading edge of the vane to be manufactured, a first layer of a base material and a second layer of an adhesive material,
   transferring the first and second draped layers in a recess of a metal foil,
   positioning the foil comprising the first and second draped layers alongside a leading edge of a vane preform comprising a fiber reinforcement impregnated with a precursor of a matrix,
   co-curing the vane preform and the first and second draped layers so as to obtain said vane made of composite material including on the leading edge of the vane a bonded metal foil.

2. The method according to claim 1, wherein the step of transferring the first and second draped layers in the recess of the metal foil comprises the installation of the metal foil on the adhesive material layer and the removal of the assembly formed by the foil and the first and second layers from the template of the leading edge.

3. The method according to claim 2 further comprising, after installation of the metal foil on the adhesive material layer and before the removal of the assembly formed by the foil and the first and second draped layers, the cutting out of the portions of said first and second draped layers extending beyond the foil.

4. The method according to claim 1 further comprising, before the draping of the first and second layers on the template of the leading edge of the vane to be manufactured, depositing an anti-adhesive layer on the template.

5. The method according to claim 1, further comprising, before the draping of the first and second layers on the template of the leading edge of the vane to be manufactured, adjusting the foil on the template.

6. The method according to claim 1, wherein the base material of the first layer is chosen from glass fibers, bronze yarns and carbon fibers.

7. The method according to claim 1, wherein the adhesive material of the second layer is chosen from epoxy adhesive, reinforced epoxy adhesive, epoxy adhesive film and reinforced epoxy adhesive film.

8. A method comprising manufacturing a fan vane, an outlet guide vane, an inlet guide vane, or a variable stator vane with the method according to claim 1.

* * * * *